United States Patent Office 2,857,360
Patented Oct. 21, 1958

2,857,360

THERMOPLASTIC COMPOSITIONS FORMED BY POLYMERIZING METHACRYLIC ACID ESTER AND BUTADIENE STYRENE LATICES

Seymour S. Feuer, Feasterville, Pa., assignor to Rohm & Haas Company, Philadelphia, Pa., a corporation of Delaware No Drawing. Application November 15, 1955
Serial No. 547,031

6 Claims. (Cl. 260—45.5)

This invention relates to improved thermoplastic compositions particularly characterized by their rigid, tough properties and exceptional ability to withstand weathering. More particularly it relates to thermoplastic compositions formed from a styrene-butadiene copolymer latex and a monomeric material solely or preponderantly of methyl methacrylate. The process whereby such compositions are made also constitutes a part of this invention.

Latices of butadiene and styrene are well known, commercially available materials. Latices of this type employed in accordance with the present invention are copolymers containing about 10 to 50% by weight of styrene or its equivalent, and about 90 to 50% by weight of butadiene. These latices are copolymers in a particulate form dispersed in an aqueous medium by means of a dispersing agent. Such copolymers have a molecular weight within the range of about 25,000 to 1,500,000 and preferably within the range of about 150,000 to 500,000. Monomeric materials solely or preponderantly of methyl methacrylate are also well known. Monomeric materials utilized in accordance with this invention comprise those containing at least 55% and preferably as much as 75% by weight of methyl methacrylate. Where 100% methyl methacrylate is not used, monomeric mixtures of methyl methacrylate with other compounds such as ethyl acrylate, acrylonitrile, vinylidene chloride, styrene or similar unsaturated compounds which are copolymerizable therewith may be employed to produce the novel compositions with which this invention is concerned. These other compounds are monomers having a single vinylidene group as the sole aliphatic carbon to carbon linkage polymerizably reactive unsaturated group.

The steps of process whereby the improved compositions of this invention are produced comprise emulsion polymerizing the monomeric methyl methacrylate or mixture of monomeric methyl methacrylate and one or more monomeric compounds copolymerizable therewith which contain in their structure a single vinylidene group, with the butadiene-styrene copolymer latex in the presence of a catalyst and a polymerization regulator which serves as a chain transfer agent at temperatures of the order of 15° C. to 80° C. Any of the well-known free-radical generating catalysts which polymerize methyl methacrylate per se may be used in the emulsion polymerization. Suitable catalysts are, for example, those of the organic peroxide type, such as methyl ethyl ketone peroxide and benzoyl peroxide, those of the hydroperoxide type, such as cumene hydroperoxide, those of the persulfate type, such as potassium persulfate, or catalysts such as azoisobutyronitrile. Thus the usual water-soluble as well as the monomer-soluble types of catalysts may be employed. Amounts of catalyst used are normally of the order of .05 to .5 part by weight of monomer used. Catalysts of the water-soluble type may be added to the diluted copolymer latex before the monomer is added, while catalysts soluble in the monomer are usually added thereto prior to bringing the monomer into contact with the latex.

Polymerization regulators suitable for use in the process are those organic sulfur compounds such as thioacids, high molecular weight mercaptans such as benzyl mercaptan, aliphatic mercaptans having at least six carbon atoms per molecule such as octyl, dodecyl and tertiary dodecyl mercaptan, mixtures of mercaptans such as are obtained for example from lauryl alcohol, nitro hydrazines, amino compounds, carbon tetrachloride and similar well-known polymerization modifiers or regulators. Alkyl mercaptans of low water solubility such as n-dodecyl mercaptan or tertiary dodecyl mercaptan are preferred. Amounts of modifier added to control the rate of polymerization may be within the range of about .2 to 5% by weight of monomer used. Addition of the modifier to the monomer prior to admixing the latter with the latex is preferred.

In addition there may be added to the composition, after polymerization, light stabilizers such as methyl or phenyl salicylate, oxidation inhibitors, such as hydroquinone or one of the amine type rubber antioxidants, fillers, coloring materials and the like as is well understood in the art.

The latices of butadiene-styrene copolymers normally contain a sufficient amount of dispersing agent such as sodium oleate, sodium lauryl sulfate or the like to maintain the copolymer in suspension in the liquid medium. Prior to addition of the monomer or comonomer to the latex in accordance herewith additional dispersing agent of the same or generally similar type is added to the latex. Thereafter, the monomer or comonomer, catalyst and polymerization regulator in admixture with the latex is emulsion polymerized in a suitable reactor under controlled temperature conditions. The amount of monomer or comonomer polymerized with the latex in accordance with this invention ranges from 85 to 65 parts by weight of the former to 15 to 35 parts by weight of solids in the latex.

To illustrate the invention more fully, the following examples are given wherein the parts specified are by weight:

*Example 1*

(a) One hundred parts of latex formed by emulsion copolymerizing 75 parts of butadiene and 25 parts of styrene in the presence of a dispersing agent at a relatively low temperature of the order of 5° C., the solids content of the latex being 50% by weight and the molecular weight of the copolymer being of the order of 500,000, was diluted with 100 parts of water containing 1.5 parts of sodium lauryl sulfate dissolved therein. The diluted latex was agitated until homogeneous. The latex above described will be referred to hereinafter as "latex A." One hundred and fifty-one parts of methyl methacrylate monomer containing 0.3 part of paramenthane hydroperoxide and 1.32 parts of n-dodecyl mercaptan were added to the diluted latex slowly with stirring to obtain a uniform stable emulsion. The emulsion so formed was maintained at 60° C. for 18 hours to effect essentially complete polymerization. Coagulation of solids was then brought about by slowly pouring the emulsion into 1500 parts of a 0.5% aqueous calcium chloride solution containing 1.0 part of 2,6 ditertiary butyl-4-methyl phenol maintained at a temperature of 90° C. Thereafter the coagulated polymer was filtered, washed, and dried under vacuum. The resulting dry powder was found particularly suitable for extrusion, pelleting and molding. It exhibited good flow characteristics and products formed therefrom had high impact strength and high heat distortion temperature. Test pieces formed by injection molding the powder, when subjected to the Izod notched impact and Charpy unnotched impact tests, showed strengths respectively of 2.4 foot pounds per inch notch and 9.15 foot pounds per inch width. The flexural modulus of a specimen test piece was 250,000 p. s. i., and the heat distortion temperature of a second test specimen (2°/min. at 66 p. s. i.) was 82° C.

(b) In lieu of the catalyst (paramethane hydroperoxide) used in (a) above, there was substituted 0.15 part of azoisobutyronitrile. Otherwise the same latex, monomer, proportions, conditions and steps of process were followed. The dry powder as formed has exceptionally good molding properties. The tough, rigid molded plastic had an Izod notched impact strength of 2.2 foot pounds per inch notch, a Charpy unnotched impact strength of 20.6 foot pounds per inch width, flexural modulus of 229,000 p. s. i., and heat distortion temperature (2°/min. at 66 p. s. i.) of 97° C.

(c) In contrast, a powder formed by milling methyl methacrylate polymer with coagulated latex A in which the ratio of solids of each of the constituents was the same as in the powder formed by emulsion polymerization as set forth in (b), when formed into similar test pieces, upon being subjected to these tests, showed strengths of .24 foot pound per inch notch and 1.83 foot pounds per inch width, respectively, and a heat distortion temperature (2°/min. at 66 p. s. i.) of 96° C.

*Example 2*

(a) Eighty-three parts of a latex formed by emulsion copolymerizing 71 parts of butadiene and 29 parts of styrene in the presence of a dispersing agent at a temperature of 60° C., the latex having a solids content of 60% by weight and the copolymer having a molecular weight of the order of 300,000, was diluted with 150 parts of water containing 1.5 parts of sodium oleate and stirred until homogeneous. This latex will hereinafter be referred to as "latex B." One hundred and fifty-one parts of a monomer mixture of 142.5 parts methyl methacrylate and 7.5 parts of acrylonitrile, to which had been added .15 part of methyl ethyl ketone peroxide and .99 part of n-dodecyl mercaptan, was slowly poured into the diluted latex while stirring the latter until a stable emulsion resulted. The admixture was subjected to polymerization, coagulation, filtering, washing, and drying as in Example 1(a). The dry powder extruded nicely, and upon being injection molded produced formed tough, rigid pieces with high gloss. The Izod notched impact and Charpy unnotched impact tests on molded pieces formed from the powder showed strengths respectively of 2.65 foot pounds per inch notch and 19.7 foot pounds per inch width. The flexural modulus of a test specimen was 218,000 p. s. i.

(b) These strengths were in marked contrast with those run on similar pieces molded from powders formed by milling coagulated latex B with a copolymer of methyl methacrylate and acrylonitrile wherein the same ratio of latex to copolymer and the same proportions of the components of the copolymer were employed as were used in polymerizing the monomer mixture with coagulated latex B in accordance with 2(a) above. In the latter instance, the strengths were .25 foot pound per inch notch and 2.1 foot pounds per inch width, respectively. The heat distortion temperatures (2°/min. at 66 p. s. i.) were 84° C. for the test specimens molded from the powder produced as set forth in 2(a) and 78° C. for similar test specimens of the milled product.

*Example 3*

One hundred and twenty-five parts of a butadiene-styrene latex formed by emulsion copolymerizing at 60° C., 54 parts of butadiene and 46 parts of styrene, the latex containing 40% by weight of copolymer solids having a molecular weight of the order of 200,000, was diluted with 150 parts of water containing 1.5 parts of sodium lauryl sulfate. To 225 parts of the diluted latex there was slowly added, while under agitation, 118 parts of methyl methacrylate containing 0.12 part azoisobutyronitrile and 0.77 part of n-dodecyl mercaptan. This coemulsion was maintained at 60° C. in a closed system for approximately 18 hours. The solids were coagulated by following the procedure given in Example 1(a), and thereafter filtered, washed, and dried under vacuum. The resulting dry powder upon being extruded into sheet form resulted in tough, rigid products. Injection molded test pieces formed from the powder had Izod notch impact strength of 1.08 foot pounds per inch notch and Charpy unnotched impact strength of 16 foot pounds per inch width. Specimen test pieces had heat distortion temperature (2°/min. at 66 p. s. i.) of 81° C. and flexural modulus of 221,000 p. s. i., respectively.

*Example 4*

To 160 parts of latex A diluted as indicated in Example 1(a) above there was added 0.32 part of potassium persulfate and the mixture was agitated until the persulfate dissolved. To this mixture was added 161.4 parts of methyl methacrylate containing 1.4 parts of n-dodecyl mercaptan and this admixture was agitated until a stable coemulsion resulted. Polymerization and processing of the coemulsion was carried out following the procedure indicated in Example 1(a) above. When the resulting dry powder was injection molded a tough, rigid plastic was produced, the properties of which were as follows: Izod notched impact strength, .863 foot pound per inch notch; Charpy unnotched impact strength, 8.7 foot pounds per inch width; heat distortion temperature of (2°/min. at 66 p. s. i.), 90° C.; flexural modulus, 280,000 p. s. i.

The following Examples 5 to 9, inclusive, illustrate the preparation of thermoplastic compositions in accordance with this invention wherein less than 65 parts by weight of monomer or comonomer is polymerized with more than 35 parts by weight of solids in the copolymer latex, and properties of the resulting products.

*Example 5*

To 233 parts of latex B diluted as indicated in Example 2(a) above there was added 150 parts of a mixture of monomers consisting of 142.5 parts of methyl methacrylate and 7.5 parts of acrylonitrile, to which monomer mixture there had been added 1.5 parts of azoisobutyronitrile and 2.25 parts of tertiary dodecyl mercaptan. The monomer-latex mixture was agitated until a stable emulsion resulted. Polymerization and processing of this emulsion following the procedure of Example 1(a) above was carried out. The resulting dry powder, upon being injection molded into test specimens, was found to have an Izod notched impact strength of 2.23 foot pounds per inch notch and a Charpy unnotched impact strength of 19.1 foot pounds per inch width. The heat distortion temperature of test specimens (2°/min. at 66 p. s. i.) was 86° C., and the flexural modulus of other test specimens thereof was 264,000 p. s. i.

*Example 6*

To 233 parts of latex B diluted as indicated in Example 2(a) there was added 150 parts of monomeric mixture consisting of 82.5 parts of methyl methacrylate and 67.5 parts of styrene, to which had been added .15 part of azoisobutyronitrile and .99 part of n-dodecyl mercaptan. The monomer-latex mixture was agitated until a stable coemulsion was formed and this coemulsion was subjected to polymerizing and processing as carried out in Example 1(a) above. Injection molded test pieces of the resulting dry powder had properties as follows: Izod notched impact strength, 3.70 foot pounds per inch notch; Charpy unnotched impact strength, 28.5 foot pounds per inch width; heat distortion temperature (2°/min. at 66 p. s. i.), 78° C.; flexural modulus, 256,000 p. s. i.

*Example 7*

To 233 parts of latex B diluted as indicated in Example

2(a) above there was added 150 parts of monomeric mixture consisting of 90 parts of methyl methacrylate, 45 parts of styrene, and 15 parts of acrylonitrile, to which had been added 1.5 parts of azoisobutyronitrile and .99 part of n-dodecyl mercaptan. The monomer-latex mixture was agitated until a stable emulsion resulted and the emulsion was polymerized and processed as indicated in Example 1(a) above. Injection molded test pieces of the resulting dry powder had properties as follows: Izod notched impact strength, 3.71 foot pounds per inch notch; Charpy unnotched impact strength, 19.5 foot pounds per inch width; heat distortion temperature (2°/min. at 66 p. s. i.), 80° C.; flexural modulus, 236,000 p. s. i.

*Example 8*

To 233 parts of latex B diluted as indicated in Example 2(a) above there was added 150 parts of a monomeric mixture consisting of 142.5 parts of methyl methacrylate and 7.5 parts of acrylonitrile, to which hade been added .15 part of tertiary butyl hydroperoxide and .99 parts of n-dodecyl mercaptan. The monomer-latex mixture was agitated until a stable coemulsion was formed, and polymerization of the coemulsion was carried out by maintaining same at a temperature of 80° C. for 18 hours. The resulting emulsion polymer was then processed as indicated in Example 1(a) above and injection molded test pieces were formed. These test pieces showed: Izod notched impact strength, 2.05 foot pounds per inch notch; heat distortion temperature (2°/min. at 66 p. s. i.), 85° C.; flexural modulus, 240,000 p. s. i.

*Example 9*

To 233 parts of latex B diluted as in Example 2(a) above there was added 150 parts of a monomer mixture consisting of 142.5 parts of methyl methacrylate and 7.5 parts of acrylonitrile, to which had been added .45 part of tertiary butyl hydroperoxide and .99 part of n-dodecyl mercaptan. After agitating the monomer-latex mixture until a uniform coemulsion resulted there was added .007 part of ferrous sulfate and .15 part of sodium sulfoxylate formaldehyde and agitation was resumed for an additional 5 minutes. The resulting coemulsion was permitted to polymerize at room temperature for 18 hours. The coemulsion was then coagulated and processed as indicated in Example 1(a) above. Injection molded test pieces of the resulting dry powder had properties as follows: Izod notched impact strength, 1.64 foot pounds per inch notch; Charpy unnotched impact strength, 33.7 foot pounds per inch width; and heat distortion temperature (2°/min. at 66 p. s. i.), 89° C.

Test specimens of molded pieces prepared as indicated in Examples 1(a), 1(b), 2(a), and 3 to 9, inclusive, along with specimens of commercially available rubber-resin blends were subjected to exposure tests using a Fade-O-Meter, fluorescent light, and outdoor weathering. The results of these tests showed that specimens produced from thermoplastic interpolymers in accordance with this invention had weathering characteristics distinctly superior to those possessed by such commercially available rubber-resin blends.

I claim:

1. A rigid, tough, solid, thermoplastic composition comprising 85 to 65 parts by weight of a member of the class consisting of methyl methacrylate and mixtures of at least 55% by weight of methyl methacrylate with another monomeric compound having a single vinylidene group as the sole aliphatic carbon to carbon linkage polymerizably reactive unsaturated group polymerized while in intimate contact with 15 to 35 parts by weight of a copolymer of 90 to 50% by weight of butadiene and 10 to 50% by weight of styrene.

2. A rigid, tough, solid, thermoplastic composition comprising 85 to 65 parts by weight of a member of the class consisting of methyl methacrylate and mixtures of at least 75% by weight of methyl methacrylate with another monomeric compound having a single vinylidene group as the sole aliphatic carbon to carbon linkage polymerizably reactive unsaturated group polymerized while in intimate contact with 15 to 35 parts by weight of a copolymer of 90 to 50% by weight of butadiene and 10 to 50% by weight of styrene.

3. A rigid, tough, solid, thermoplastic composition comprising 85 to 65 parts by weight of methyl methacrylate polymerized while in intimate contact with 15 to 35 parts by weight of a copolymer of 90 to 50% by weight of butadiene and 10 to 50% by weight of styrene.

4. A method of producing a rigid, tough, solid, thermoplastic composition which comprises polymerizing 85 to 65 parts by weight of a member of the class consisting of methyl methacrylate and mixtures of at least 55% by weight of methyl methacrylate with another monomeric compound having a single vinylidene group as the sole aliphatic carbon to carbon linkage polymerizably reactive unsaturated group while in intimate contact with 15 to 35 parts by weight of a copolymer of 90 to 50% by weight of butadiene and 10 to 50% by weight of styrene in latex form, the polymerization being carried out in the presence of a free-radical polymerization initiator and a chain transfer agent at a temperature of about 15° C. to 80° C.

5. A method of producing a rigid, tough, solid, thermoplastic composition which comprises polymerizing 85 to 65 parts by weight of a member of the class consisting of methyl methacrylate and mixtures of at least 75% by weight of methyl methacrylate with another monomeric compound having a single vinylidene group as the sole aliphatic carbon to carbon linkage polymerizably reactive unsaturated group while in intimate contact with 15 to 35 parts by weight of a copolymer of 90 to 50% by weight of butadiene and 10 to 50% by weight of styrene in latex form, the polymerization being carried out in the presence of a free-radical polymerization initiator and a chain transfer agent at a temperature of about 15° C. to 80° C.

6. A method of producing a rigid, tough, solid, thermoplastic composition which comprises polymerizing 85 to 65 parts by weight of methyl methacrylate while in intimate contact with 15 to 35 parts by weight of a copolymer of 90 to 50% by weight of butadiene and 10 to 50% by weight of styrene in latex form, the polymerization being carried out in the presence of a free-radical polymerization initiator and a chain transfer agent at a temperature of about 15° C. to 80° C.

References Cited in the file of this patent

UNITED STATES PATENTS

| | | |
|---|---|---|
| 2,745,818 | Te Grotenhuis | May 15, 1956 |
| 2,755,270 | Hayes | July 17, 1956 |